United States Patent [19]
Beswick

[11] 3,892,793
[45] July 1, 1975

[54] MANUFACTURE OF ISOCYANATES
[75] Inventor: Geoffrey Ernest Beswick, Manchester, England
[73] Assignee: Imperial Chemical Industries Limited, London, England
[22] Filed: Jan. 13, 1972
[21] Appl. No.: 217,623

[30] Foreign Application Priority Data
    Jan. 22, 1971   United Kingdom................. 2963/71

[52] U.S. Cl. ............................................ 260/453 P
[51] Int. Cl. ......................................... C07c 119/04
[58] Field of Search................................. 260/453 P

[56] References Cited
UNITED STATES PATENTS
3,440,270   4/1969   McMaster et al.................... 260/453
3,631,199   12/1971   Smith................................. 260/453

Primary Examiner—Lewis Gotts
Assistant Examiner—Dolph H. Torrence
Attorney, Agent, or Firm—Cushman, Darby & Cushman

[57] ABSTRACT

In a process for the manufacture of organic isocyanates by reacting an organic halide containing at least one aliphatically bound halogen atom with an alkali metal, ammonium or alkaline earth metal cyanate, the improvement which comprises in a first stage rendering the alkali metal, ammonium or alkaline earth metal cyanate into a fine state of sub-division by milling in solvent in the presence of a finely divided inert substrate.

4 Claims, No Drawings

MANUFACTURE OF ISOCYANATES

This invention relates to the manufacture of isocyanates by the reaction of compounds containing aliphatically bound halogen atoms and inorganic cyanates.

It is known that organic isocyanates can be obtained from organic halides, particularly those in which the halide is attached to an aliphatic carbon atom, by reaction with alkali, alkaline earth or ammonium cyanates at elevated temperatures. It is also known that improved results are obtained when the inorganic cyanate is in a fine state of subdivision.

We have now found that the yield and operability of the process may be improved by carrying out a milling of the inorganic cyanate in the presence of a finely divided inert substrate.

Thus according to the present invention there is provided a process for the manufacture of organic isocyanates which comprises reacting an organic halide containing at least one aliphatically bound halogen atom with an alkali metal, ammonium or alkaline earth metal cyanate characterised in that the alkali metal, ammonium or alkaline earth metal cyanate is first rendered into a fine state of sub-division by milling in solvent in the presence of a finely divided inert substrate.

Alkali metal, alkaline earth metal or ammonium cyanates which may be used in the present process include the cyanates of lithium, sodium, potassium, magnesium, calcium, strontium, barium and the ammonium ion. They also include the cyanates of substituted ammonium ions such as methyl ammonium, dimethylammonium, trimethylammonium and triethylammonium cyanates.

In order to produce the cyanate in the required fine state of sub-division it is necessary that it be milled in a solvent in the presence of a finely divided inert substrate.

As solvent for use in the milling stage there may be used any of the solvents normally used in the halide/cyanate reaction, such solvents are water free and non-reactive towards the isocyanate group, examples are listed hereinafter.

As finely divided inert substrate there may be used any such material which is inert in the fact that it is unreactive towards the reactants and the isocyanate group. Finely divided inert materials of the type commonly used as catalyst supports are particularly suitable. Examples of such materials include activated carbons, kieselguhr and related siliceous earths including filter aids such as Hyflo Supercel, pumice, porcelain, silica, asbestos, alumina, quartz, kaolin and magnesia.

Activated carbons and siliceous earths are the preferred substrates.

The milling of the inorganic cyanate in the presence of the inert substrate may be carried out by any of the standard milling techniques, for example ball milling, gravel milling or high speed shear milling.

The amount of inert substrate may vary considerably, levels of about 5 percent to 20 percent by weight of the inorganic cyanate have been found to be sufficient.

After the milling stage the cyanate, solvent and inert substrate mixture is added to the rest of the reactants and the reaction carried out in conventional manner.

Organic halides which can be used in this process are those in which there is at least one halogen atom which is aliphatically bound; by the term aliphatically bound is intended direct attachment of the halogen atom to a saturated aliphatic carbon atom as distinct from a carbon atom in an aromatic or an unsaturated heterocyclic ring. The term aliphatic carbon atom includes carbon atoms in cycloaliphatic rings.

Organic halides to which the process can be applied include alkyl halides, cycloalkyl halides, halogenated aliphatic ethers, halogenoalkylarenes, halogenoalkyl aryl ethers, alkenyl halides, halogenoesters and halogenoketones.

Examples of individual organic halides which can be used include methyl iodide, ethyl bromide, isopropyl chloride, tertiary butyl chloride, n-butyl bromide, n-hexyl bromide, cyclohexyl bromide, hexamethylene dibromide, 1,4-dibromocyclohexane, decyl bromide, decamethylene dibromide, dodecyl chloride, n-octadecyl bromide, allyl chloride; 1,4-dichlorobut-2-ene; 1,3-chlorobromo-propane, products obtained by chloromethylation of alcohols and mixtures thereof, for example, methoxymethyl chloride, ethoxymethyl chloride, 2-chloroethoxymethyl chloride, 2-ethoxyethoxymethyl chloride, n-butoxymethyl chloride, cyclohexyloxymethyl chloride, ethylene glycol bis-(chloromethyl)ether, 1,2-propylene glycol bis-(chloromethyl)ether, 1,3-propylene glycol bis-(chloromethyl ether), 1,4-tetramethylene glycol bis-(chloromethyl)ether, diethylene glycol bis-(chloromethyl)ether, dipropylene glycol bis-(chloromethyl)ether, 1,1,1-trimethylolpropane tris-(chloromethyl) ether, allyl chloromethyl ether, benzyl chloromethyl ether, β-phenylethylchloromethyl ether, β-phenoxyethyl chloromethyl ether, p-xylylene diol bis-(chloromethyl) ether and 1,4-bis(2'-chloromethoxy ethoxy) benzene; 2-chlorotetrahydrofuran, monochlorodioxan, α-chloroethylmethylether, 1,2-dimethoxy-1,2-dichloroethane, ethyl chloroacetate, ethyl β-chloropropionate, tris-(chloroethyl)phosphate, tris-(β-bromopropyl)phosphite, bis-(chloroethyl)phthalate; compounds obtained by chloromethylation of aromatic hydrocarbons and ethers, for example, benzyl chloride, 2-, 3- and 4-methyl benzyl chlorides, 2-, 3- and 4-ethyl benzyl chlorides, 2,4-dimethyl benzyl chloride, 2,4,6-trimethyl benzyl chloride, m-xylylene dichloride, p-xylylene dichloride, 4,6-dimethyl-m-xylylene dichloride, 2,4-bis(chloromethyl) toluene, 2,4-bis-(chloromethyl)-p-xylene, bis-(chloromethyl)mesitylene, bis-(chloromethyl)pseudocumene, bis-(chloromethyl)hemimellitene, bis-(chloromethyl)-durene, bis-(chloromethyl)isodurene, tris-(chloromethyl)toluene, tris-(chloromethyl)ethyl benzene, tris-(chloromethyl)-m-xylene and tris-(chloromethyl)mesitylene, α-naphthylmethyl chloride, β-naphthylmethyl chloride, 2,6-bis-(chloromethyl) naphthalene, α-chloromethyl tetralin, β-chloromethyl tetralin, 1,3-bis-(chloromethyl)tetralin, 9,10-bis-(chloromethyl)anthracene, 9,10-bis-(chloromethyl)-1,2,3,4,5,6,7,8-octahydroanthracene, 4-chloromethyl diphenyl, 4,4'-bis-(chloromethyl)-diphenyl, 2,4,4'-tris-(chloromethyl)diphenyl and related products obtained by chloromethylation of diphenyl alkanes, diphenyl ether, diphenylsulphide, diphenylsulphone and diphenoxyalkanes, 4-methoxy benzyl chloride, 4-ethoxybenzyl chloride, 2,4-bis-(chloromethyl) anisole, 2,4-bis(chloromethyl)-3,5-dimethyl anisole, 2,4,6-tris-(chloromethyl)-3,5-dimethyl anisole, 4-chlorobenzyl chloride, 3,4-dichlorobenzyl chloride, bis- (chloromethyl)-monochlorobenzene, 2-chloromethyl-4-chlorotoluene, 2,6-bis-(chloromethyl)-4-chlorotoluene, 2-chloromethyl-4-bromoethyl benzene and related chloromethylates of halogenated alkylated benzenes, 1-chloro-1-phenyl ethane, 1-chloro-2(4'-chlorophenyl)ethane, 1-chloro-2-(2'-chlorophenoxy)ethane, 2,2'-dichlorodiethyl ether, 1-(4'-chloromethylphenoxy)-2-chloroethane, 3-nitrobenzylchloride, 3-nitro-4-methyl-benzyl chloride, bis-(chloromethyl)-m-chloro-anisole, 3-chloroethyl acetophenone and 3,3'-bis-(chloromethyl)-benzophenone.

Mixtures of products particularly those obtained by the chloromethylation of aromatic hydrocarbons may be used, such starting materials are particularly useful for obtaining liquid isocyanate mixtures.

The process is particularly applicable to the reaction of α-haloalkylarenes containing more than one α-haloalkyl group. Preferred compounds of this type are those of the general formula:

Arene (CR$_2$ Halogen)$_n$ where $n$ is 2 to 4 and R independently represents hydrogen or an alkyl group of from 1 to 4 carbon atoms and the halogen atom is chlorine or bromine.

The arene or aryl group may be for example a benzene ring, two benzene rings linked by sulphur, oxygen, a direct bond or a group $C_mH_{2m}$ where $m$ is from 1 to 6, naphthyl, anthracenyl, phenanthryl or fluorenyl. Any of the above arene or aryl groups may optionally be substituted by at least one of the following, the halogen atoms fluorine, chlorine, bromine or iodine, alkyl groups of from 1 to 20 carbon atoms, alkoxy groups of from 1 to 4 carbon atoms or 1,4-alkenyl groups forming a further ring with the aryl group, for example, as in tetralin.

Thus examples of α-haloalkylarenes which can be used in the present process include: 2,5-dimethyl p-xylylene dichloride, 2,5-dimethyl p-xylylene dibromide, 2,3,5,6-tetramethyl p-xylylene dichloride, 9,10-bis-(chloromethyl)-1,2,3,4,5,6,7,8-octahydroanthracene, p-xylylene dichloride, benzyl chloride, benzyl bromide, 1,4-bis-chloromethyl naphthalene, 1,4-bis-(α-chloroethyl)-benzene, 1,3-bis-(α-chloroethyl)-benzene, m-xylylene dichloride, m-xylylene dibromide, 4-methyl-m-xylylene dichloride, 4-ethyl-m-xylylene dichloride, 4,5-dimethyl-m-xylylene dichloride, 4,6-dimethyl-m-xylylene dichloride, 2,4,5-trimethyl-m-xylylene dichloride, 2,4,5,6-tetramethyl-m-xylylene dichloride, 4-methyl benzylchloride, 4-butyl benzylchloride; 4-dodecylbenzylchloride, 2-methyl-4-ethylbenzylbromide, 4-methyl-6-ethyl-m-xylylenedichloride, 2-methyl-5-ethyl-m-xylylenedichloride, 1,3,5-tris-(chloromethyl)-2,4,6-trimethylbenzene, 1,3,5-tris-(chloromethyl)-m-xylene, 4-methoxybenzylchloride, 4-methoxy-m-xylylenedichloride, 1,3,5-tris(chloromethyl)-2-methoxy-4,6-dimethylbenzene, 2,4-bis-(chloromethyl)-1-methoxy-3,5-dimethylbenzene, 3-chlorobenzyl chloride, 4-chlorobenzylchloride, 3,4-dichlorobenzylchloride, 5-chloro-m-xylylene dichloride, 2-methyl-5-chloro-m-xylylene dichloride, 1-chloromethylnaphthalene, 2-chloromethylnaphthalene, 2,6-bis-(chloromethyl)naphthalene, 1-chloromethyl tetralin; 1,3-bis-(chloromethyl)tetralin, 1,4-bis (p-chloromethylphenyl)butane, 9,10-bis(chloromethyl)anthracene; 4,4'-bis(chloromethyl)diphenyl, 4,4'-bis(chloromethyl)diphenylmethane; 4,4'-bis(chloromethyl-diphenylether; 2,4,4'-tris(chloromethyl)diphenyl.

Preferred α-haloalkylarenes for use in the present process are those wherein the arene or aryl nucleus is a benzene ring. Particularly preferred are such compounds wherein the benzene ring is substituted in at least one position ortho to each —CR$_2$ Halogen by an alkyl group for example methyl or ethyl and wherein R is hydrogen and the halogen is chlorine. Such starting materials are easily obtained by chloromethylation of alkylated benzenes.

The invention is particularly useful for the manufacture of isocyanates wherein $n$ is 1,2 or 3.

Examples of solvents which may be used include tertiary amides such as dimethyl formamide, and dimethylacetamide, sulphoxides such as dimethylsulphoxide, sulphones such as diphenylsulphone, nitriles, such as acetonitrile and benzonitrile, ketones such as acetone, methyl ethyl ketone, cyclohexanone and methyl isobutyl ketone, methyl-N,N-dimethyl carbamate, ethyl-N,N-dimethyl carbamate, N-carbethoxy piperidine, n-butyl acetate, propyl acetate, ethylene and propylene carbonates, ethylene glycol dimethyl ether and 2-methoxy ethyl acetate and esters of phosphonic acids such as the dimethyl ester of methyl phosphonic acid. Mixtures of solvents may be used.

There may be used as solvents mixtures of polar solvents with solvents of low polarity. Polar solvents which may be used in such mixtures include amides, carbamates, sulphones, ureas, nitriles, nitro compounds and phosphonamides, for example, dimethyl formamide, N-methyl pyrrolidine, formamide, acetamide, N-methyl acetamide, diethyl formamide, diisopropyl formamide, diphenyl formamide, methyl ethyl formamide, dimethylacetamide, methyl ethyl acetamide, dicyclohexyl acetamide, ethyl cyclohexyl acetamide, ethyl phenyl acetamide, N-isopropyl-pyrrolidone, N-methyl piperidone, N-methyl caprolactam, ethyl N,N-dimethyl carbamate, methyl N,N-diethyl carbamate, N-carbomethoxy piperidine, dimethyl sulphone, tetramethylene sulphone, pentamethylene sulphone, methyl ethyl sulphone, methyl cyclohexyl sulphone, methyl benzyl sulphone, methyl phenyl sulphone, diphenyl sulphone, tetramethyl urea, hexamethyl phosphonamide, acetonitrile, propionitrile, benzonitrile, 3-methoxy-propionitrile, 4-chloro-butyronitrile, cyclohexane nitrile, benzyl cyanide, succinonitrile, adiponitrile, nitrobenzene, the nitrotoluenes, nitromethane, nitroethane and nitropropane.

Solvents of low polarity which may be used in such mixtures include aliphatic, cycloaliphatic, aromatic and araliphatic hydrocarbons such as benzene, toluene, xylene, diethyl benzene, isopropyl benzene, ethyl naphthalene, octane, petroleum ethers, cyclohexane and methyl cyclohexane, halogenated aromatic hydrocarbons such as monochlorobenzene, the dichlorobenzenes, trichlorobenzene.

The present process may be carried out in the presence of known catalysts from the reaction, including for example copper and its salts, quaternary ammonium salts, particularly bromide and iodide, and iodides of alkali and alkaline earth metals.

The process may also be carried out using iodine, bromine, iodine monochloride, or mixtures thereof as catalyst.

The reaction is normally carried out at atmospheric pressure at temperatures of from 20°C to 250°C. although temperatures outside this range can be used. A preferred reaction temperature is from 50°C to 160°C.

The process is carried out by heating together the halide and cyanate optionally in the presence of a catalyst; the period of heating required is to a large extent dependent on the halide used, on the temperature and on the catalyst employed.

At least one molar proportion of the cyanate is employed for each aliphatically bound halogen atom in the starting material and the cyanate is preferably employed in excess.

The amount of catalyst used may be from 0.001 percent to 5 percent by weight of the organic halide although amounts outside this range may be used if desired.

On completion of the reaction the product may be isolated by standard methods, in cases where a polar solvent is used it is preferably to remove the polar solvent before removal of the inorganic residues as described in our copending U.S. application No. 58,661 (27.7.70.).

Thus it is a preferred feature of the present process that any polar solvent be substantially completely removed before the inorganic residues are removed from the reaction mixture. If a mixed polar/non-polar solvent medium is used the polar solvent is conveniently removed by distillation and the inorganic residues then removed from the resulting solution in the non-polar solvent. This of course will only be possible if the polar solvent has a boiling point lower than that of the non-polar solvent. If the polar solvent has the higher boiling point then both solvents may be removed and replaced by a further non-polar solvent before removing the inorganic residues. It is clearly more convenient to use a mixed solvent in which the non-polar solvent has the higher boiling point.

Whether a polar solvent is used alone or not, it may be removed by distillation and replaced either during the distillation by gradual addition of a non-polar solvent or may be replaced at the end of the distillation.

After removal of the polar solvent the inorganic residues may conveniently be removed by filtration or centrifuging.

With the present process it has been found that the reaction rate is increased by the use of the special milling technique and that it is possible to carry out the reaction at a lower temperature than is possible without the use of this milling technique.

The process may be used for the manufacture of monoisocyanates or for isocyanates containing two or more isocyanate groups. Such isocyanates may be used for the manufacture of monomeric, oligomeric or polymeric urethanes or ureas by known processes.

The invention is illustrated but not limited by the following examples in which all parts and percentages are by weight except where otherwise stated.

EXAMPLE 1

A 250 ml glass flask was fitted with mechanical stirrer, thermometer and Dean and Stark side arm. Provision was made for heating the flask contents under reduced pressure. To the flask was charged dimethylacetamide (50 parts) and petrol ether B.Pt. 80°–100°C (40 parts). The mixture was heated to reflux temperature (90°C) at atmospheric pressure and held for 10 minutes to remove any water by azeotropic distillation.

Meanwhile, a slurry of potassium cyanate (10 parts), active carbon (1 part) in white spirit (32 parts) was prepared by milling the mixture in a small beaker for ten minutes using a Silverson mixer-emulsifyer. The slurry was charged to the reaction flask and any water removed by azeotropic distillation by heating to 106°C. The slurry was cooled to 40°–45°C and 1,4-bis(chloromethyl) durene (11.6 parts), iodine (0.3 parts), phosphorus pentoxide (0.5 parts) added. The pressure was reduced to 10–15 mm Hg. and the temperature held at 48°–50°C for four and a quarter hours, the more volatile petrol ether fractions being drained off continuously. A gas-liquid chromatographic test of the liquors diluted with chloroform then showed only 1,4-bis(isocyanatomethyl) durene to be the major component present. White spirit (64 parts) was added and the bulk of the dimethyl acetamide removed by vacuum distillation, the final temperature rising to 60°C at a pressure of 10 mm Hg. The reaction mixture was extracted by boiling cyclohexane (120 parts), screened to remove inorganic salts and polymer impurities and the filtrates cooled to crystallise the 1,4-bis(isocyanatomethyl)durene formed. This was filtered off and dried to give 7.9 parts of white solid which, by isocyanate analysis, was 83.3 percent strength to a Mol. Wt. of 244, corresponding to a yield of 53.9 percent of theory.

In a comparative experiment in which the active carbon support for the potassium cyanate was omitted, only a minute amount of 1,4-bis(isocyanatomethyl)durene was formed after five hours, indicated by a gas-liquid chromatographic test of a sample of the reaction liquors dissolved in chloroform.

EXAMPLE 2

A mixture of potassium cyanate (10 parts), potassium iodide (0.5 part), active carbon Actibon C (1 part) and dry acetone (80 parts) was milled with a Silverson mixer-emulsifier for 10 minutes. The suspension was further charged with 1,4-bis-(chloromethyl)durene (11.6 parts), tetramethyl urea (0.5 part), phosphorus pentoxide (1.5 parts) and dry acetone (40 parts).

A second mixture was made, identical with the first, except that the Actibon C was absent.

Both were heated with stirring to 58°C., the rate of stirring being adjusted to be the same in each case. Samples of the reaction mixtures were taken at intervals, diluted with chloroform, and subjected to gas-liquid chromatographic analysis. The gas-liquid chromatograms thus obtained were compared as to the relative amounts of 1,4-bis(isocyanatomethyl)durene formed. It was found that the rate of formation of the bis isocyanate was greater in the mixture containing the active carbon viz:

| Time (hrs) | Relative amount of 1,4-bis-(isocyanatomethyl)durene formed | |
| --- | --- | --- |
| | Without active carbon | With active carbon |
| 4¼ | 21.1 | 43.5 |
| 6¼ | 46.9 | 70.9 |

EXAMPLE 3

A mixture of potassium cyanate (10 parts), potassium iodide (0.5 part), Hyflo Supercel (2 parts) and dry acetone (80 parts) was milled with a Silverson mixer-emulsifier for 10 minutes. The suspension was stirred at 58°C with 1,4-bis-(chloromethyl)durene (11.6 parts), tetramethyl urea (0.5 part), phosphorus pentoxide (1.5 parts) and further dry acetone (40 parts) for 17 hours, after which time complete conversion to 1,4-bis-(isocyanatomethyl) durene was shown by a gas-liquid chromatogram of a sample of the mixture.

The hot reaction mixture was filtered to remove the Hyflo Supercel and inorganic salts, the filtrates being collected in a flask containing petroleum ether 100/120°C (66 parts). The residues on the filter were washed with dry acetone (40 parts) which was bulked with the main filtrates. Acetone was then distilled off until the temperature of the mixture rose to 78°C. It was then cooled to −20°C and the product allowed to crystallise. This was filtered off, washed with a little petroleum ether 100/120°C and dried. There was obtained 11.8 parts of 1,4-bis-(isocyanatomethyl) durene, of strength 90.6 percent by isocyanate titration to M.W. 244, corresponding to a yield of 87.6 percent theory.

We claim:

1. In a process for the manufacture of organic isocyanates of the formula

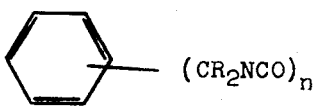

wherein R independently represents hydrogen or an alkyl group of from 1 to 4 carbon atoms, the benzene nucleus is substituted in at least one position ortho to each —$CR_2NCO$ group by an alkyl group and $n$ is from 2 to 4 which comprises reacting a halide of the formula

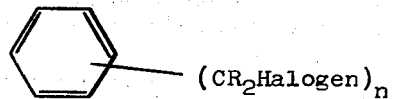

wherein R and n are as above defined, halogen represents a chlorine or bromine atom and the benzene nucleus is substituted in at least one position ortho to each —$CR_2$Halogen group by an alkyl group, with an alkali metal, ammonium or alkaline earth metal cyanate, the improvement which comprises first rendering the cyanate into a fine state of subdivision by milling in a solvent for the reaction in the presence of a finely divided inert substrate selected from the group of activated carbons and siliceous earths.

2. A process as claimed in claim 1 wherein the amount of finely divided inert substrate is from 5 percent to 20 percent by weight of the cyanate.

3. A process as claimed in claim 1 wherein the reaction is carried out at a temperature of from 50°C to 160°C.

4. A process according to claim 1 wherein the organic isocyanate is 1,4-bis-(isocyanatomethyl)-durene.

* * * * *